United States Patent [19]

Sasaki et al.

[11] Patent Number: 5,214,591
[45] Date of Patent: * May 25, 1993

[54] METHOD OF CORRECTING ERROR ON INVOLUTE INTERPOLATION

[75] Inventors: Takao Sasaki, Hachioji; Toshiaki Otsuki; Kunihiko Murakami, both of Hino; Masafumi Sano, Minamitsuru, all of Japan

[73] Assignee: Fanuc Ltd., Minamitsuru, Japan

[*] Notice: The portion of the term of this patent subsequent to Apr. 7, 2009 has been disclaimed.

[21] Appl. No.: 663,935
[22] PCT Filed: Jul. 12, 1990
[86] PCT No.: PCT/JP90/00901
 § 371 Date: Feb. 27, 1991
 § 102(e) Date: Feb. 27, 1991
[87] PCT Pub. No.: WO91/01521
 PCT Pub. Date: Feb. 7, 1991

[30] Foreign Application Priority Data

Jul. 21, 1989 [JP] Japan .................. 1-190176

[51] Int. Cl.⁵ .......................... G05B 19/415
[52] U.S. Cl. .................. 364/474.31; 364/474.35; 318/573
[58] Field of Search ............ 364/474.15, 474.17, 364/474.18, 474.28, 474.29, 474.31, 474.32, 474.34, 474.35; 318/568.18, 569, 570, 571, 572, 573, 727

[56] References Cited

U.S. PATENT DOCUMENTS

| | | | |
|---|---|---|---|
| 4,893,971 | 1/1990 | Watanabe et al. | 364/474.31 |
| 4,899,096 | 2/1990 | Kawamura et al. | 318/573 |
| 4,926,102 | 5/1990 | Kawamura et al. | 318/573 |
| 4,935,681 | 6/1990 | Kawamura et al. | 318/570 |
| 4,959,597 | 9/1990 | Kawamura et al. | 364/474.31 |
| 4,968,925 | 11/1990 | De Doncker | 318/727 |
| 5,065,333 | 11/1991 | Kawamura et al. | 364/474.31 |
| 5,075,865 | 12/1991 | Kawamura et al. | 364/474.31 |
| 5,101,147 | 3/1992 | Sasaki et al. | 318/573 |
| 5,103,150 | 4/1992 | Sasaki et al. | 364/474.31 |

FOREIGN PATENT DOCUMENTS 0160705 11/1985 European Pat. Off. .

Primary Examiner—Jerry Smith
Assistant Examiner—Thomas E. Brown
Attorney, Agent, or Firm—Staas & Halsey

[57] ABSTRACT

An involute interpolation error correcting method corrects an error on involute interpolation in a numerical control system for machining gears and pump vanes. The method corrects an insufficient cut in an actual configuration of a workpiece which is machined along a first involute curve (In1) that is commanded. A radius of curvature (Rs) from a base circle (C) to a starting point (Ps3) of the insufficient cut on the first involute curve (In1), and an error (De) which occurs at an ending point of the first involute curve (In1) in a direction normal to the insufficient cut, are determined from the machined configuration, and set as parameters in the numerical control system. On interpolation from the starting point (Ps3) of the insufficient cut to the ending point (Pe1) of the first involute curve, a first offset at the time the first involute curve is interpolated is changed to a second offset which is increased from the first offset by the error (De). On interpolation up to a point (Ae1), the offset is restored to its original value. The configuration which is machined according to the above process is free of the insufficient cut. An excessive cut can be prevented when the offset is reduced.

3 Claims, 3 Drawing Sheets

METHOD OF CORRECTING ERROR ON INVOLUTE INTERPOLATION

TECHNICAL FIELD

The present invention relates to a method of correcting an error on involute interpolation in a numerical control system, and more particularly to a method of correcting an error such as an insufficient cut or an excessive cut which would occur in the event that the terminal end of an involute curve is positioned in the vicinity of a base circle.

BACKGROUND ART

Nonlinear interpolation, particularly involute interpolation, in numerical control systems is highly required for the machining of gears, pump vanes, or the like. Generally, an involute curve is interpolated by a computer or an NC program generator which is separate from a numerical control system, producing linear data on a tape, and a workpiece is machined by the numerical control system using the tape, The applicants have filed Japanese Patent Application No. 62-157302 (Japanese Laid-Open Patent Publication No. 64-2106) on an involute interpolation speed control method. According to the disclosed method, an involute curve is simply interpolated in a numerical control system, and the speed in a tangential direction is held constant irrespective of the angle.

In the proposed involute interpolation speed method, the coordinates of a point on an involute curve are given by:

$$X = R\{\cos(\theta + \theta 1) + \theta \sin(\theta + \theta 1)\} + Xo$$

$$Y = R\{\sin(\theta + \theta 1) + \theta \cos(\theta + \theta 1)\} + Yo,$$

where R is the radius of a base circle, and Xo and Yo are the coordinates of the center of the base circle. Then, the angle $\theta$ is increased in a range from $\theta = (\theta 2 - \theta 1)$ to $\theta = (\theta 3 - \theta 1)$ by an increment:

$$\theta n+1 = \theta n + K/(R \cdot \theta),$$

a point $Xn+1$, $Yn+1$ corresponding to the increased angle is determined according to the above equations, and the difference between the points is determined, thus interpolating the involute curve.

The speed in a tangential direction can be rendered constant by selecting the increment of $\theta$ to be of a value which is reduced in inverse proportion to the angle, i.e., a value of $K/(R \cdot \theta)$.

In the vicinity of the base circle for the involute curve, i.e., a region where the radius of curvature of the involute curve is relatively small, however, an insufficient cut or an excessive cut tends to occur due to a servo response delay, a thermal deformation of the workpiece, or the like.

FIG. 2 of the accompanying drawings shows the manner in which a workpiece is machined according to a conventional involute interpolation process. A base circle C is a circle based on which an involute curve is drawn. The base circle C has a center O represented by coordinates (Xo, Yo) and a radius R.

An involute curve In1 starts at a point Ps1 and ends at a point Pe1. An arcuate curve A1 starts at a point As1 and ends at a point Ae1. An arcuate curve A2 starts at a point As2 and ends at a point Ae2. An involute curve In2 starts at a point Ps2 and ends at a points Pe2. The positional coordinates of these points are commanded in advance by a numerical control system based on a tape or the like. Actually, another arcuate curve is interposed between the arcuate curves A1, A2 to provide a smooth junction near the point As2. However, such another arcuate curve is omitted from illustration.

A cutter W moves according to interpolation along a programmed command path which is composed of the involute curve In1, the arcuate curve A1, the arcuate curve A2, and the involute curve In2. When a workpiece is actually machined by the cutter based on the program, however, the workpiece is machined along a solid line curve Re between a point Ps3 and the point Ae1, leaving a hatched region uncut short of the commanded machining configuration, i.e., an insufficient cut.

The insufficient cut starts at the point Ps3, which is spaced from the base circle C by a radius of curvature Rs, and is progressively larger toward the point Pe1. At the point Pe1, the workpiece remains uncut by a distance De normal to the involute curve In1. After the involute curve In1 is interpolated, and when the arcuate curve A1 is interpolated, the insufficient cut is progressively reduced, converging toward the point Ae1. As can be seen from FIG. 2, the insufficient cut is large in the vicinity of the junction between the involute curve In1 and the arcuate curve A1.

Since the insufficient cut occurs in a region where high precision is required, i.e., a portion of the involute curve In1 where the radius of curvature is small and a portion of the arcuate curve A1 which is joined to the involute curve In1, the insufficient cut has posed a serious problem in machining a workpiece along an interpolated involute on a numerical control system.

The above description is directed to an insufficient cut which takes place when a workpiece is machined along a concave portion of an involute curve. However, when a workpiece is machined along a convex portion of an involute curve, an excessive cut occurs which also has posed the same problem as described above.

DISCLOSURE OF THE INVENTION

The present invention has been made in view of the aforesaid drawbacks. It is an object of the present invention to provide an involute curve interpolation error correcting method which allows an involute curve to be interpolated without an insufficient cut or an excessive cut.

In order to achieve the above object, there is provided a method of correcting an error on involute interpolation in an numerical control system, comprising the steps of when an insufficient cut or an excessive cut occurs in an actual configuration of a workpiece which is machined along a first involute curve that is commanded, determining a radius of curvature from a base circle to a starting point of the insufficient cut or the excessive cut on the first involute curve, and an error which occurs at an ending point of the first involute curve in a direction normal to the insufficient cut or the excessive cut, setting the radius of curvature and the error as parameters in the numerical control system, changing a first offset at the time the first involute curve is interpolated to a second offset which differs from the first offset by the error, on interpolation from the starting point of the insufficient cut or the excessive cut to the ending point of the first involute curve, and dividing the first involute curve into a second involute curve having an ending point which is the same as the starting point of the insufficient cut or the excessive cut, and a third involute curve having a starting point which is the same as the starting point and an ending point which is spaced the error from the ending point of the first involute curve in a direction normal thereto.

When an insufficient cut or an excessive cut occurs in an actual configuration of a workpiece which is machined along a first involute curve that is commanded, a radius of curvature from a base circle to a starting point of the insufficient cut or the excessive cut on the first involute curve, and an error which occurs at an ending point of the first involute curve in a direction normal to the insufficient cut or the excessive cut, are estimated, and set as parameters in the numerical control system. Based on the values of the parameters, the numerical control system changes a first offset at the time the first involute curve is interpolated to a second offset which differs from the first offset by the error, on interpolation from the starting point of the insufficient cut or the excessive cut to the ending point of the first involute curve, and divides the first involute curve into a second involute curve with the offset unchanged and a third involute curve with the offset changed. Specifically, the first involute curve is divided into a second involute curve having an ending point which is the same as the starting point of the insufficient cut or the excessive cut, and a third involute curve having a starting point which is spaced the error from the ending point of the first involute curve in a direction normal thereto.

Since the first involute curve which would suffer the insufficient cut or the excessive cut is changed to the new third involute curve, when the workpiece is machined based on the changed involute curve, a cutter moves along a first commanded path. Therefore, the machined configuration of the workpiece is free of the insufficient cut or the excessive cut.

BEST MODE FOR CARRYING OUT THE INVENTION

An embodiment of the present invention will hereinafter be described with reference to the drawings.

Figure 2:
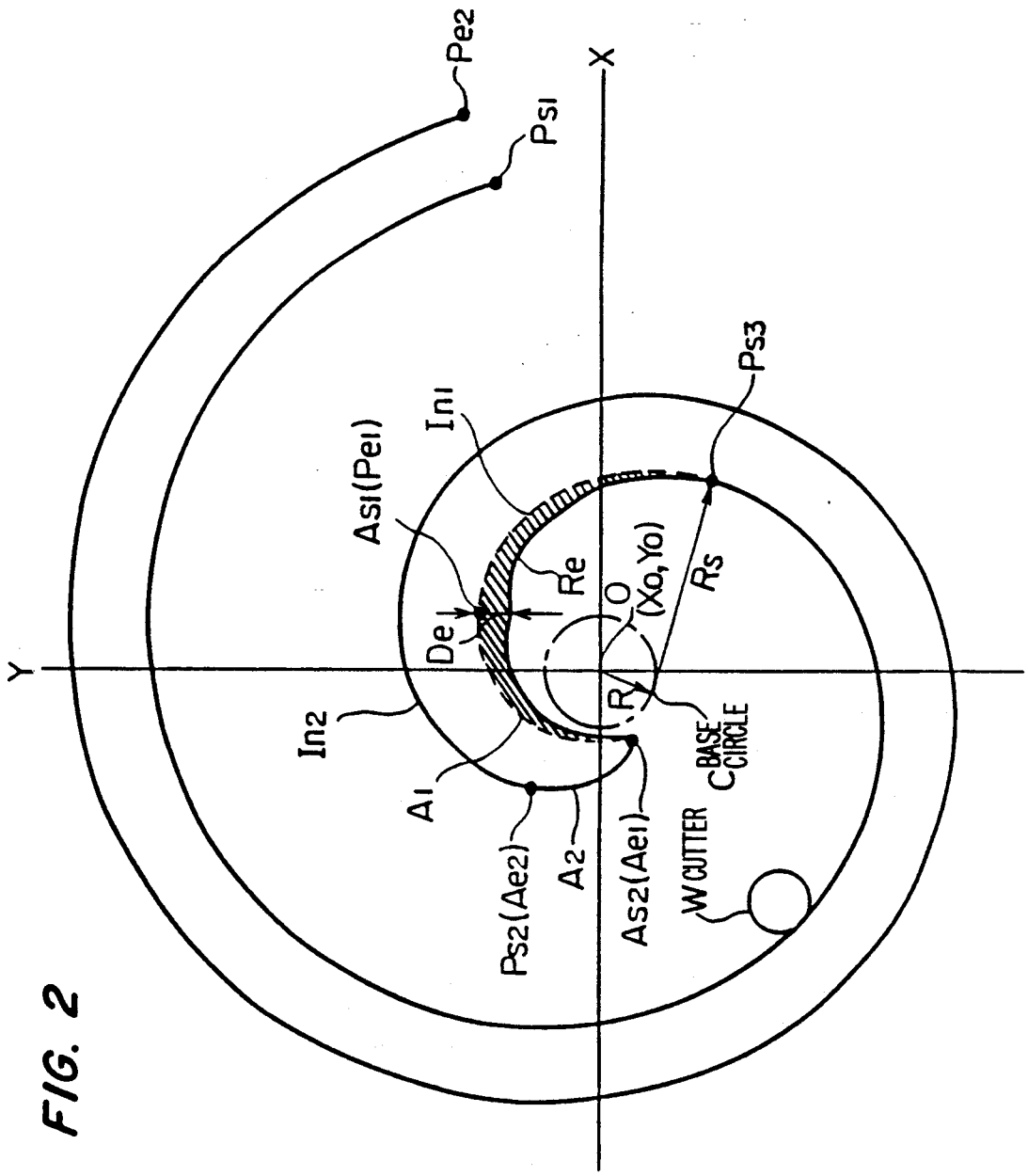
FIG. 2 is a diagram showing the manner in which a workpiece is machined according to a conventional involute interpolation process.

In this embodiment, a workpiece is first machined by a cutter in a trial cutting process as shown in FIG. 2, and thereafter an error De representing an insufficient cut or an excessive cut, and a radius of curvature Rs at a point Ps3 where an insufficient cut starts being produced, are estimated and set as parameters in a numerical control system.

The error De is estimated as the distance from an ending point Pe1 of an involute curve In1 in a direction normal to an insufficient cut or an excessive cut. The radius of curvature Rs is estimated as the distance from a base circle C to a starting point Ps3 of the insufficient cut or the excessive cut on the involute curve In1. It is necessary, however, to determine the error De and the radius of curvature Rs based on empirical values obtained in the trial cutting process or the like since the error De and the radius of curvature Rs vary depending on various factors such as the nature of the workpiece, the type of the cutter, etc.

Figure 1:
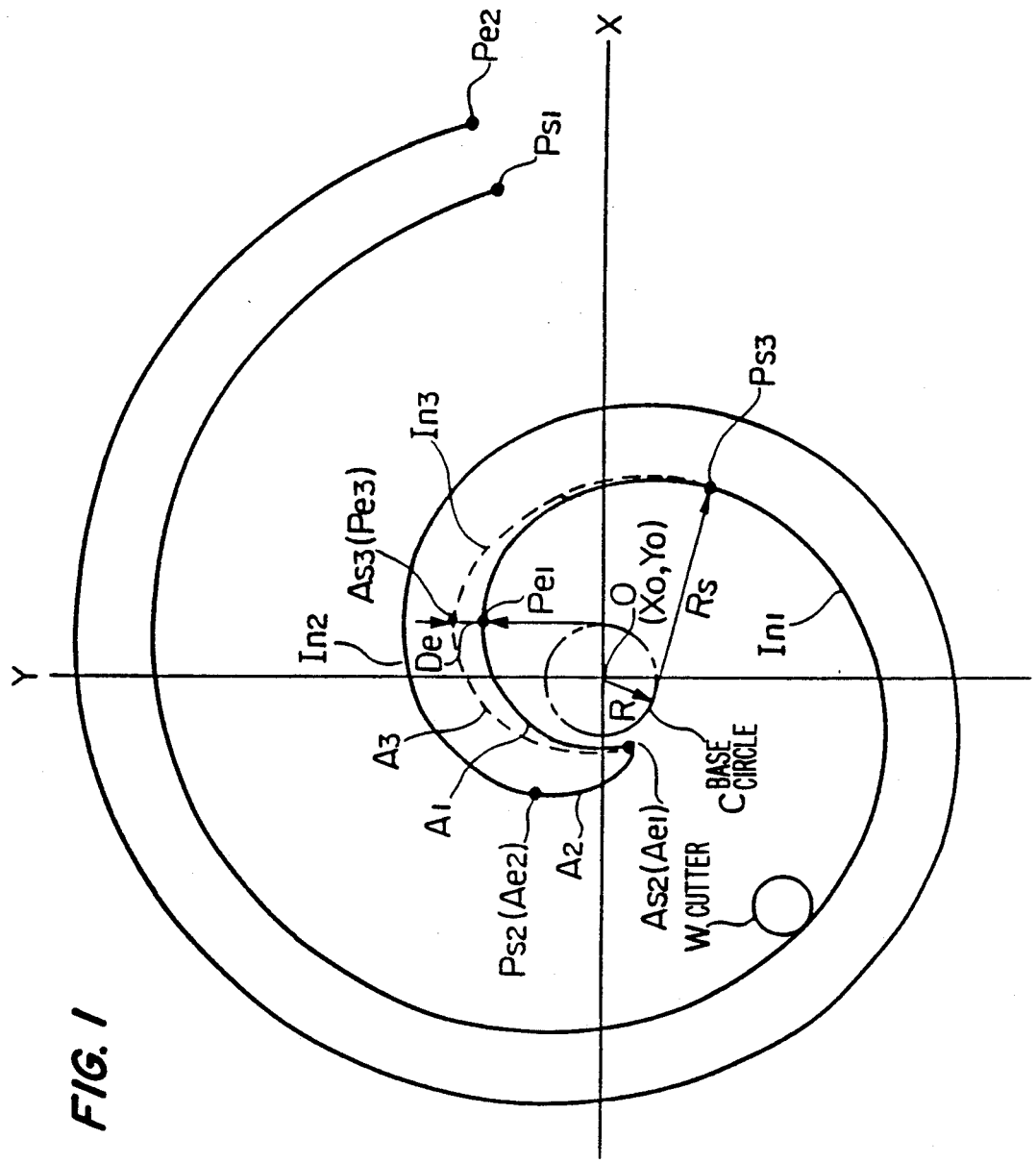
FIG. 1 is a diagram showing the manner in which an involute curve is interpolated with an involute curve interpolation error correcting method according to the present invention.

FIG. 1 is illustrative of the manner in which an involute curve is interpolated with an involute curve interpolation error correcting method according to the present invention, FIG. 1 corresponding to FIG. 2. Those parts shown in FIG. 1 which are identical to those shown in FIG. 2 are denoted by identical reference characters, and will not be described in detail below.

In FIG. 1, the involute curve In1, up to the point Ps3, is a curve which is interpolated with a first offset when commanded by a program. An involute curve In3 is a curve which is interpolated with a second offset which is produced by varying the first offset when the involute curve In1 is interpolated, by the error De from the point Ps3. Specifically, the involute curve In1 is interpolated in an interval extending from the starting point Ps1 to the point Ps3, with the offset not varied. In an interval from the point Ps3 to a point Pe3, the involute curve In3 is interpolated with the offset that has been varied by the error De.

The involute curve In3 starts at the point Ps3 where the workpiece starts remaining uncut, i.e., and insufficient cut starts occurring, and ends at the point Pe3 which is spaced the error De from the point Pe1 in a direction normal to the involute curve In1. This is because when the offset is varied in a cutter compensation mode, the position of the ending point in a machine coordinate system within a block in which the offset is varied is shifted by the difference between the offset before it is varied and the offset after it is varied. Such an operation is inherent in the numerical control system.

Then, the arcuate curve A1 joined to the involute curve In1 has its starting point changed or shifted to a point As3 which is the same as the point Pe3, by the involute curve In3. The numerical control system interpolates the arcuate curve A1 with the offset being restored to its original value, i.e., the first offset at the time the involute curve In1 is interpolated. The arcuate curve A1 is thus interpolated as an arcuate curve A3 which starts at the point As3 and ends at the point Ae1 which is the same as the ending point of the arcuate curve A1. This operation is also caused because the offset is varied in the cutter compensation mode.

Based on the error De and the radius of curvature Rs set as parameters, the numerical control system then effects the following process:

(a) The coordinates of the point Ps3 on the involute curve In1 are determined on the bases of the radius of curvature Rs.

(b) In the interval from the starting point Ps1 to the point Ps3, the involute curve In1 is interpolated with the offset thereof.

(c) In the interval from the point Ps3 to the ending point Pe1, the involute curve In1 is interpolated with the offset which is varied by the error De. That is, the involute curve In1 is changed to the involut curve In3 which starts at the point Ps3 and ends at the point Pe3 that is shifted from the point Pe1 by the error De in the normal direction, and the involute curve In3 is interpolated.

(d) Then, the arcuate curve A1 is interpolated with the offset being restored to the offset of the involute curve In1. Stated otherwise, the arcuate curve A1 is changed to the arcuate curve A3 which starts at the point As3 that is the same as the point Pe3 and ends at the point Ae1 that is the same as the ending point of the arcuate curve A1.

Based on the involute curve thus interpolated according to the above process, the workpiece can be machined without undesirable insufficient cuts.

The step (c) above is carried out according to the involute interpolation method disclosed in Japanese Laid-Open Patent Publication No. 64-57313. More specifically, inasmuch as the starting point Ps3 and the ending point Pe3 do not exist on the same involute curve, as with the involute curve In3, the component of the involute curve in the normal direction is varied by the error De in proportion to the winding angle of the involute curve. In this manner, the involute curve In1 and the involute curve In3 are smoothly joined to each other.

In the above description, the involute curve In1 and the arcuate curve A1 are joined to each other. In case an involute curve is joined to another commanded path such as of a straight line, a spline curve, an involute curve, or the like, both paths can smoothly be joined together by restoring the offset to its original value from the starting point of the commanded path and interpolating the path.

Figure 3:
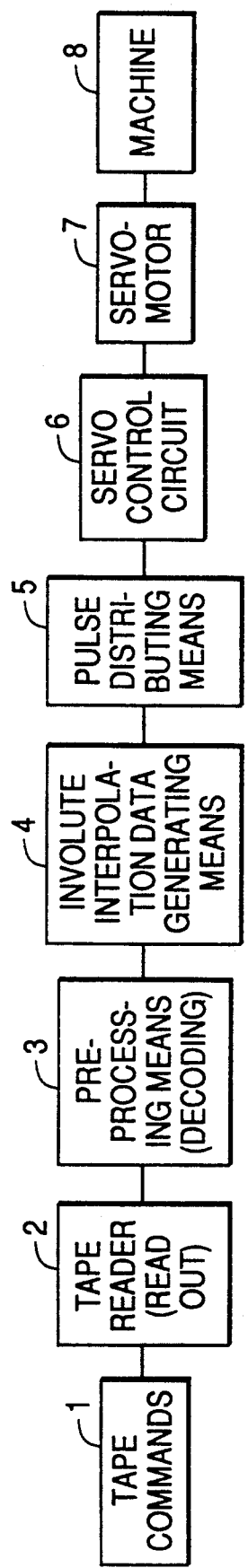
FIG. 3 is a schematic block diagram of a numerical control system in the embodiment of the present invention.

FIG. 3 schematically shows the numerical control system in the embodiment. Tape commands 1 are given by a tape with punched commands. The tape commands 1 are read by a tape reader 2. A preprocessing means 3 determines, from the G code, whether there is an involute interpolation command or not. An involute interpolation data generating means 4 generates data necessary for involute interpolation based on command values and the radius of curvature Rs and the error De which are set as parameters. A pulse distributing means 5 increases the angle to make constant the tangential speed of the involute curve and determine points on the involute curve based on the data generated by the involute interpolation data generating means 4 according to the above equations, effects the interpolation, and distributes pulses. A servo control circuit 6 energizes a servomotor 7 according to the command. The servomotor 7 causes a ball screw or the like to move a machine 8.

In the above embodiment, the present invention has been described with respect to the insufficient cut. However, a workpiece can be machined while correcting an involute interpolation errir which would otherwise occur due to an excessive cut, by setting, as parameters, the radius of curvature at a point where the excessive cut would start and an error that would be caused by the excessive cut.

With the present invention, as described above, a commanded path for an involute curve can automatically be varied on the basis of an error which would be caused by an insufficient cut or an excessive cut and a radius of curvature where a correction is to be started, the error and the radius of curvature being set as parameters in a numerical control system. Therefore, a workpiece can be machined highly accurately along an involute curve free from an insufficient cut or an excessive cut.

We claim:

1. A method of correcting an error on involute interpolation in an numerical control system, comprising the steps of:

when an insufficient cut or an excessive cut occurs in an actual configuration of a workpiece which is machined along a first involute curve that is commanded, determining a radius of curvature from a base circle to a starting point of said insufficient cut or said excessive cut on said first involute curve, and an error which occurs at an ending point of said first involute curve in a direction normal to said insufficient cut or said excessive cut;

setting said radius of curvature and said error as parameters in the numerical control system;

changing a first offset at the time said first involute curve is interpolated to a second offset which differs from said first offset by said error, on interpolation from said starting point of the insufficient cut or the excessive cut to said ending point of said first involute curve; and dividing said first involute curve into a second involute curve having an ending point which is the same as said starting point of the insufficient cut or the excessive cut, and a third involute curve having a starting point which is the same as said starting point and an ending point which is spaced said error from said ending point of said first involute curve in a direction normal thereto.

2. A method according to claim 1, wherein when a curve or a straight line having a starting point which is the same as the ending point of said first involute curve is joined to said first involute curve, an offset at the time of interpolating said curve or said straight line is restored to said first offset.

3. A method according to claim 2, wherein said curve is an arcuate curve, a spline curve, or an involute curve.

* * * * *